United States Patent
Lee et al.

(10) Patent No.: US 8,325,320 B2
(45) Date of Patent: Dec. 4, 2012

(54) METHOD FOR REPAIRING LCD DEVICE AND LCD DEVICE WITH USING THE SAME METHOD

(75) Inventors: Jae Kyun Lee, Gunpo-si (KR); Dong Su Shin, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 367 days.

(21) Appl. No.: 11/471,572

(22) Filed: Jun. 21, 2006

(65) Prior Publication Data
US 2007/0132933 A1   Jun. 14, 2007

(30) Foreign Application Priority Data
Dec. 12, 2005  (KR) .................. 10-2005-0121848

(51) Int. Cl.
G02F 1/13 (2006.01)
G02F 1/1341 (2006.01)
G02F 1/1339 (2006.01)
H01L 21/00 (2006.01)

(52) U.S. Cl. ........... 349/192; 349/189; 349/190; 438/30

(58) Field of Classification Search ............... 349/192, 349/154, 187, 189, 190; 438/30
See application file for complete search history.

(56) References Cited

U.S. PATENT DOCUMENTS

| | | | | |
|---|---|---|---|---|
| 4,820,025 | A * | 4/1989 | Nakanowatari | 349/154 |
| 7,256,862 | B2 * | 8/2007 | Chen et al. | 349/192 |
| 7,319,504 | B2 * | 1/2008 | Liu et al. | 349/187 |
| 2005/0057716 | A1 * | 3/2005 | Hou et al. | 349/154 |
| 2005/0275792 | A1 | 12/2005 | Chen et al. | |

FOREIGN PATENT DOCUMENTS

| | | | |
|---|---|---|---|
| JP | 06265913 A | * | 9/1994 |
| JP | 11352501 A | * | 12/1999 |
| TW | 242092 B | | 10/2005 |

* cited by examiner

Primary Examiner — Mark Robinson
Assistant Examiner — Paisley L Arendt
(74) Attorney, Agent, or Firm — Morgan, Lewis & Bockius LLP

(57) ABSTRACT

A method for repairing a liquid crystal display (LCD) device is provided for an LCD device whose LCD panel has a gravity defect. The method includes the steps of cutting an edge of the LCD panel, applying pressure to a surface of the LCD panel to exhaust excess liquid crystal material through the cut edge, and sealing the cut edge.

13 Claims, 8 Drawing Sheets gravity defect

METHOD FOR REPAIRING LCD DEVICE AND LCD DEVICE WITH USING THE SAME METHOD

This application claims the benefit of the Korean Patent Application No. P2005-121848, filed on Dec. 12, 2005, which is hereby incorporated by reference.

BACKGROUND OF THE INVENTION

1. Field of the Invention

The present invention relates to a liquid crystal display (LCD) device, and more particularly, to a method for repairing an LCD device and an LCD device with using the same method, in which an edge of an LCD panel having a gravity defect is cut to exhaust liquid crystals and repaired by a new LCD panel having no gravity defect.

2. Discussion of the Related Art

The demand for various display devices has increased with the development of the information society. Accordingly, much effort has been made to research and develop various flat display devices, such as liquid crystal display (LCD) devices, plasma display panel (PDP) devices, electroluminescent display (ELD) devices, and vacuum fluorescent display (VFD) devices. Some species of flat display devices have already been applied to displays for various equipment.

Among the various flat display devices, liquid crystal display (LCD) devices have been most widely used due to their thin profile, light weight, and low power consumption. In fact, LCD devices are providing a substitute for cathode ray tube (CRT) devices. In addition to mobile type LCD devices such as displays for notebook computers, LCD devices have been developed for computer monitors and televisions.

To use LCD devices in various fields as a general display, LCD devices must be developed that can implement high quality picture with high resolution and high luminance on a large-sized screen while still maintaining light weight, thin profile, and low power consumption.

A general LCD device includes first and second substrates bonded to each other with a space therebetween, and a liquid crystal layer formed in the space between the first and second substrates by injection. In more detail, the first substrate includes a plurality of gate lines arranged along a first direction at fixed intervals and a plurality of data lines arranged along a second direction perpendicular to the first direction at fixed intervals. A plurality of pixel regions are defined by the gate lines and the data lines. A plurality of electrodes are arranged within the pixel regions. A plurality of thin film transistors, formed at regions where the gate lines cross the data lines, apply data signals of the data lines to the pixel electrodes in accordance with signals supplied to the gate lines. Also, the second substrate includes a black matrix layer that prevents light from reaching portions except the pixel regions, R/G/B color filter layers formed to correspond to the pixel regions, for displaying various colors, and a common electrode for producing the image on the color filter layers.

In the aforementioned LCD device, the liquid crystal layer is formed between the first and second substrates. As such, liquid crystal molecules of the liquid crystal layer are driven by an electric field generated between the pixel electrode and the common electrode. Light irradiated through the liquid crystal layer may be controlled by the alignment direction of the liquid crystal molecules, thereby displaying the image.

This kind of LCD device is referred to as a twisted nematic (TN) mode LCD device, which has disadvantageous characteristics such as a narrow viewing angle. To overcome the problem of a narrow viewing angle, an in-plane switching (IPS) mode LCD device has been developed. In the IPS mode LCD device, a pixel electrode and a common electrode are formed in a pixel region of a first substrate in parallel with each other at a fixed interval so that an IPS mode electric field (horizontal electric field) occurs between the pixel electrode and the common electrode, thereby aligning the liquid crystal layer according to the IPS mode electric field. Spacers are formed between the first and second substrates of the aforementioned LCD device to maintain a constant interval for the liquid crystal layer. The spacers may be ball spacers or column spacers. Ball spacers have a spherical shape and are dispersed on the first or second substrates. Also, ball spacers are relatively free in their movement even after the first and second substrates are bonded together. The ball spacers have a small contact area with the first and second substrates. In contrast, the column spacers are formed on the first substrate or the second substrate by an array process. The column spacers are formed on a predetermined substrate in a column shape having a predetermined height. Therefore, the column spacers have a relatively large contact area with the first and second substrates.

Hereinafter, a related art LCD device provided with a column spacer will be described with reference to the accompanying drawings. FIG. 1 is a sectional view illustrating a related art LCD device provided with a column spacer.

As shown in FIG. 1, the related art LCD device provided with a column spacer includes first and second substrates 30 and 40 opposed to each other, a column spacer 20 formed between the first and second substrates 30 and 40, and a liquid crystal layer (not shown) filled between the first and second substrates 30 and 40. The first substrate 30 includes a gate line 31 crossing a data line (not shown) to define a pixel region, a thin film transistor TFT formed on a crossing region of the gate line 31 and the data line, and a pixel electrode (not shown) formed in each pixel region. The first substrate 30 further includes a gate insulating layer 36 formed on the entire surface including the gate line 31, and a passivation layer 37 formed over the gate insulating layer 36. The second substrate 40 includes a black matrix layer 41 corresponding to a region other than the pixel region, a stripe shaped color filter layer 42 corresponding to vertical pixel regions parallel with the data line, and a common electrode or an overcoat layer 43 formed on the color filter layer 42. The column spacer 20 is formed to correspond to a predetermined position above the gate line 31.

In the LCD device provided with the column spacers 20, when an LCD panel 10 is arranged in a vertical direction under a high temperature environment, liquid crystals inside the LCD panel 10 in a height direction expand more than the column spacers 20. In this case, the column spacers 20 may be spaced apart from its opposing substrate 30. At this time, the liquid crystals flow into the space between the column spacers 20 and its opposing substrate 30 and then concentrated on a lower corner, thereby causing light leakage at the lower corner. This is referred to as a gravity defect.

Hereinafter, the principle of the gravity defect will be described with the accompanying drawings. FIGS. 2A and 2B are sectional views illustrating the LCD panel arranged in a vertical direction at a room temperature and a high temperature, respectively, and FIG. 2C is a sectional view illustrating the gravity defect generated from the LCD panel of FIG. 2B.

In case of the LCD panel arranged in a vertical direction as shown in FIG. 2A (a liquid crystal layer 25 is filled between first and second substrates 30 and 40 opposing each other), the liquid crystals are neither expanded nor contracted at a room temperature so that respective regions of the LCD panel are maintained at a uniform thickness.

If the LCD panel of FIG. 2A is subjected to a high temperature environment as shown in FIG. 2B, the liquid crystals 25 between the first and second substrates 30 and 40 expand. At this time, under the high temperature environment, the liquid crystals 25 expand more than the column spacers 20 of a solid state. Therefore, the liquid crystals 25 expand more than a cell gap between the first and second substrates 30 and 40 supported by the column spacers 20.

In this case, if the liquid crystals 25 expand as shown in FIG. 2C, the column spacers 20 are separated from its opposing substrate, i.e., the first substrate 30. At this time, the liquid crystals are gathered on the lower corner adjacent to the ground along the gap between the column spacer and the first substrate due to the effects of gravity. For this reason, the cell gap increases at the lower corner, and light leakage at the lower corner is observed due to excessive liquid crystals. This is known as a gravity defect.

FIG. 3 is a photograph illustrating the gravity defect. As shown in FIG. 3, light leakage is observed at some of the lower corners of the LCD panels where the gravity defects occur. Any LCD panels having such gravity defects must be found and thrown away before distribution of the LCD devices or during their lighting test. Accordingly, it is necessary to prevent the gravity defects to improve productivity of the LCD device.

In summary, the aforementioned related art LCD device has several problems. For example, in LCD devices provided with column spacers, when the LCD panel is arranged in a vertical direction under the high temperature environment, the liquid crystals inside the LCD panel expand more than the column spacers expand in a height direction. Thus, the column spacers may separate from the opposing substrate. At this time, the liquid crystals flow into the space between the column spacers and the opposing substrate. The liquid crystals then concentrate at the lower corner, thereby causing light leakage at the lower corner, known as the gravity defect. The LCD panels having such gravity defects must be found before distribution of the LCD devices, such as during their lighting test, and thrown away. Accordingly, it is necessary to prevent the gravity defect to improve manufacturing of the LCD device.

SUMMARY OF THE INVENTION

Accordingly, the present invention is directed to a method for repairing an LCD device, which substantially obviates one or more problems due to limitations and disadvantages of the related art.

An object of the present invention is to provide a method for repairing an LCD device, in which an edge of an LCD panel has a gravity defect.

Another object of the present invention is to provide an LCD device which has been repaired to avoid a gravity defect.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for repairing a liquid crystal display (LCD) device whose LCD panel has a gravity defect to be repaired comprises the steps of cutting an edge of the LCD panel; applying pressure to a surface of the LCD panel to exhaust excess liquid crystal material through the cut edge; and sealing the cut edge.

In another aspect, a liquid crystal display (LCD) device comprises a first substrate a second substrate disposed facing the first substrate; a liquid crystal layer disposed between the first and second substrates a sealant disposed around an entire periphery of the liquid crystal layer to join the first and second substrates and to contain the liquid crystal layer, the sealant having a first sealant portion around the entire periphery of the liquid crystal layer except a cut corner portion and a second sealant portion at the cut corner portion to seal the cut corner portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
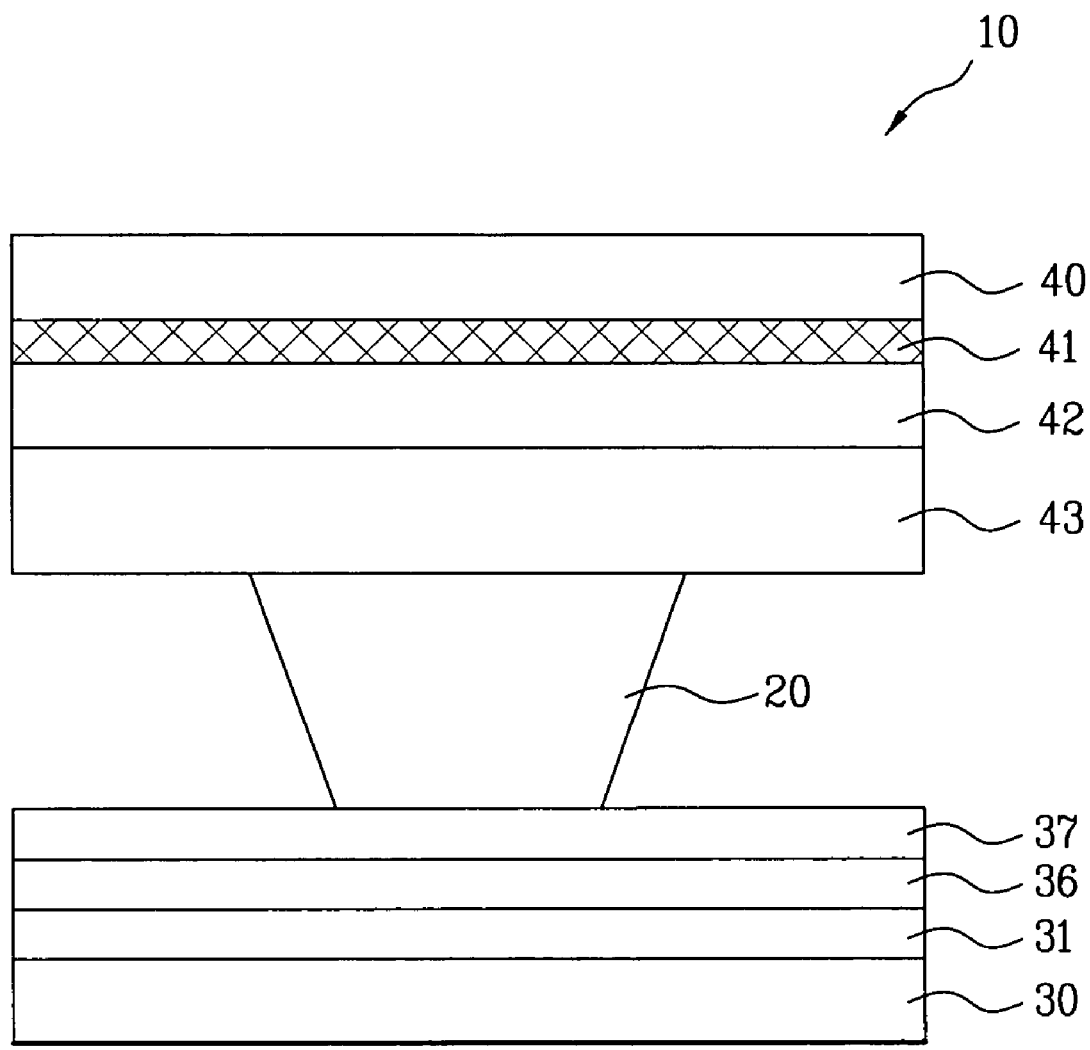
FIG. 1 is a sectional view illustrating a related art LCD device provided with a column spacer.
Figure 2A:
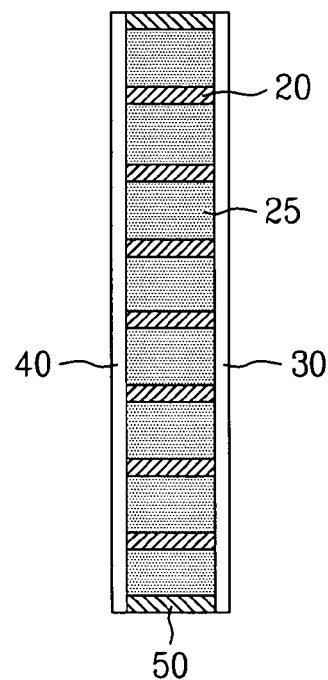
FIGS. 2A and 2B are sectional views illustrating an LCD panel arranged in a vertical direction at a room temperature and a high temperature, respectively.
Figure 2B:
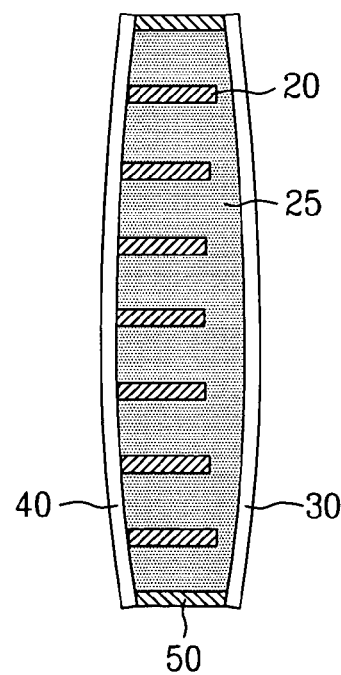
Figure 2C:
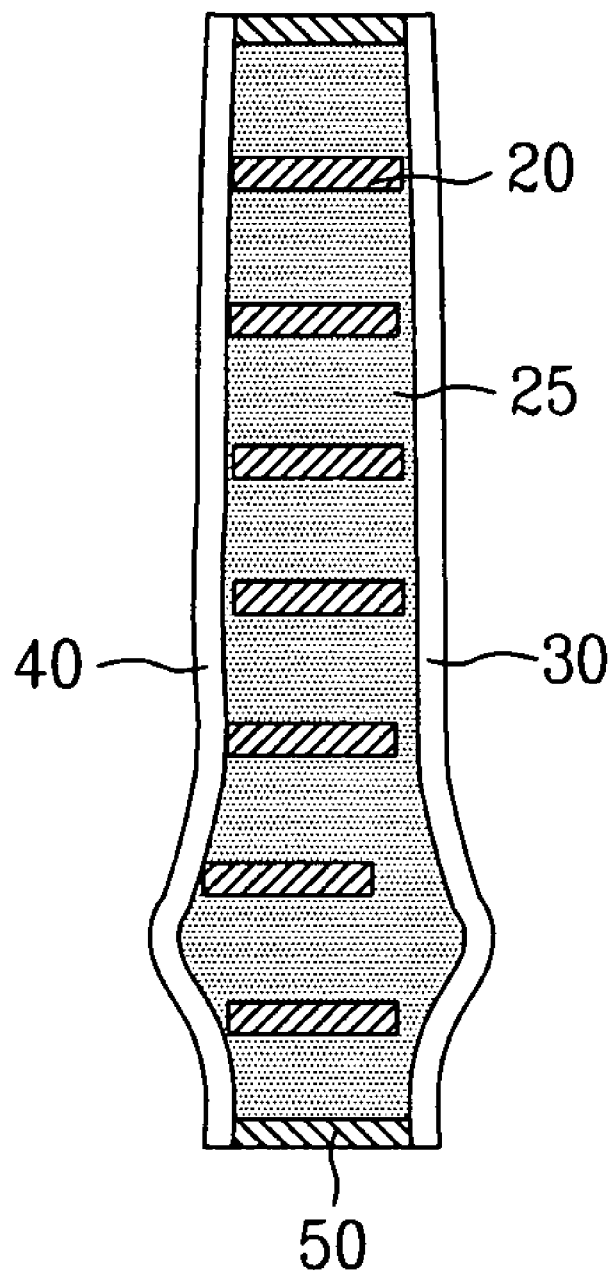
FIG. 2C is a sectional view illustrating a gravity defect generated from the LCD panel of FIG. 2B.
Figure 3:
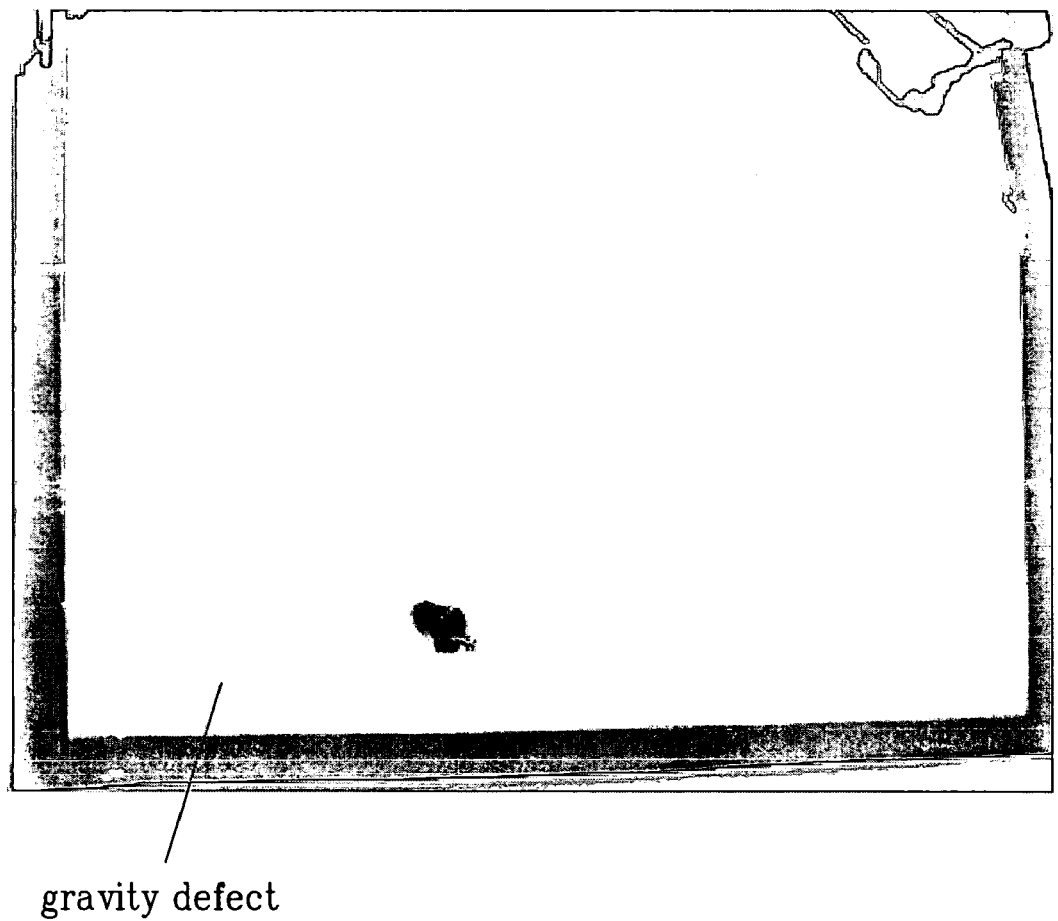
FIG. 3 is a photograph illustrating a gravity defect.
Figure 4:
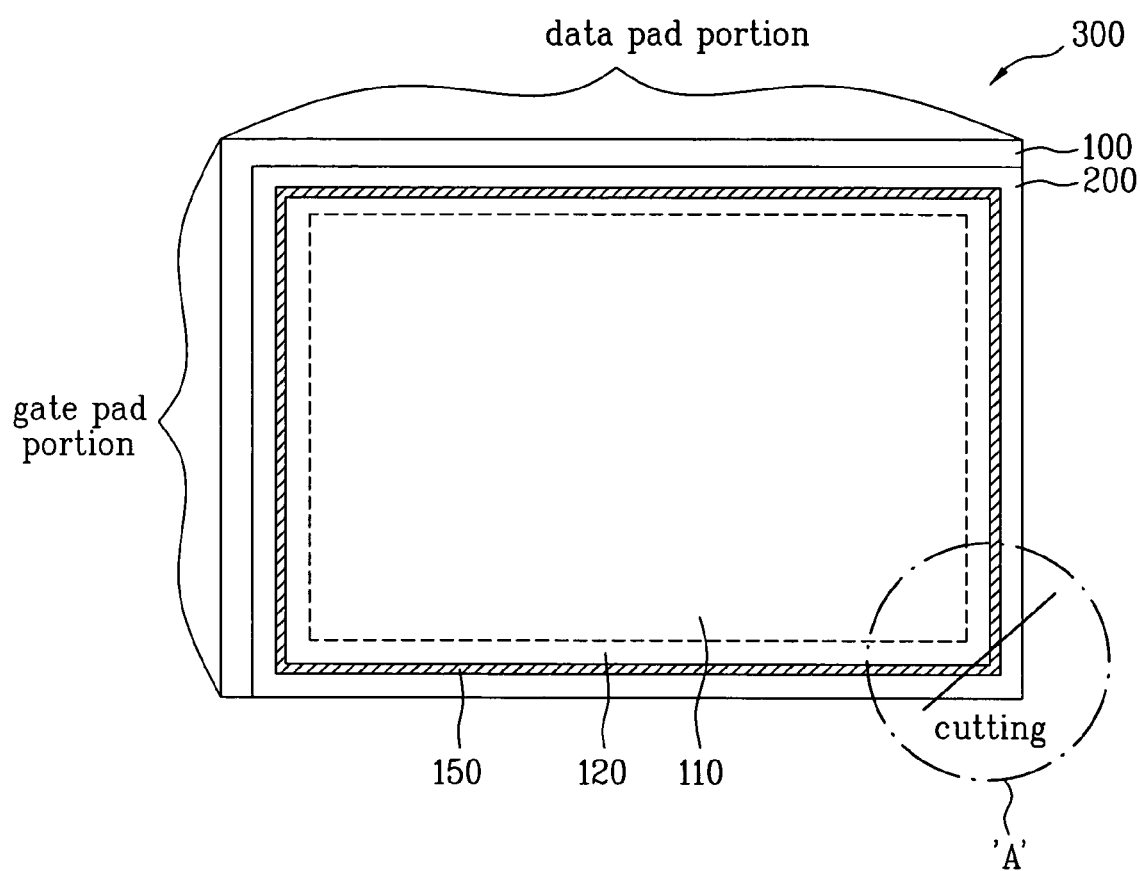
FIG. 4 is a plane view illustrating a cut portion when an exemplary LCD device of the present invention is repaired.
Figure 5:
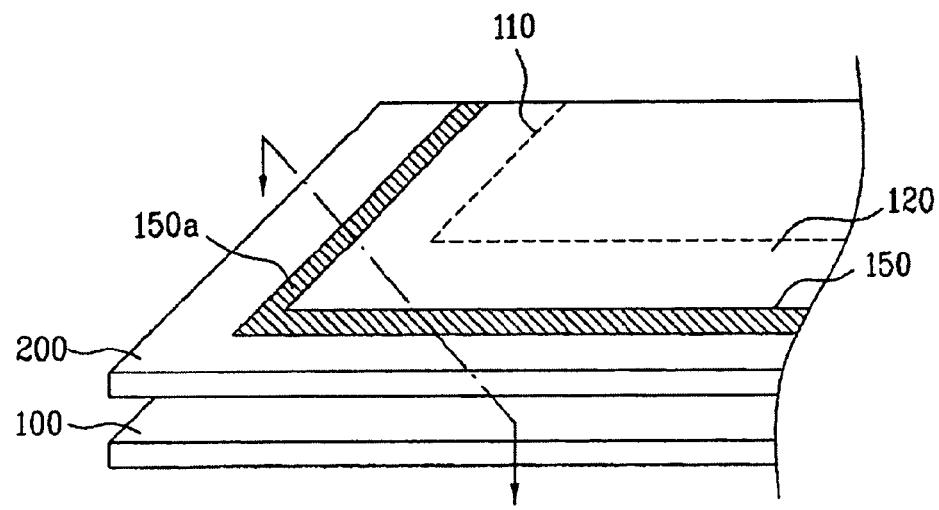
FIG. 5 is a perspective view illustrating the exemplary LCD device of FIG. 4.

FIG. 4 is a plane view illustrating a cut portion when an exemplary LCD device of the present invention is repaired, and FIG. 5 is a perspective view illustrating the LCD device of FIG. 4.

As shown in FIG. 4, an LCD panel 300 includes first and second substrates 100 and 200 opposing each other, a liquid crystal layer (not shown) filled between the first and second substrates 100 and 200, and a first sealant 150 formed outside the liquid crystal layer. The first sealant 150 is formed to bond the first substrate 100 to the second substrate 200.

The first substrate 100 is larger than the second substrate 200 at two sides. The portions where the first substrate 100 is larger than the second substrate 200 are used as a gate pad portion and a data pad portion. The gate pad portion and the data pad portion correspond to a portion of a drive IC that applies signals to gate and data lines of a thin film transistor array formed on the first substrate 100.

The first and second substrates 100 and 200 are defined by a display area 110 (inside a dotted region) and a non-display area 120 (outside a dotted region) outside the display area 110. The first substrate 100 of the LCD panel 300 is provided with a thin film transistor array, and the second substrate 200 is provided with a color filter array.

The fabrication of the LCD panel will now be described.

A thin film transistor array process and a color filter array process are respectively performed on the first substrate 100 and the second substrate 200. A sealant 150 is formed on the non-display area of any one of the first and second substrates 100 and 200 to surround each array of the first and second substrates 100 and 200. Subsequently, liquid crystals are dropped onto any one of the first and second substrates 100 and 200, and the other substrate onto which the liquid crystals are not dropped is reversed so that the two substrates oppose each other.

The first and second substrates 100 and 200 are bonded so that the first sealant 150 bonds the two substrates to each other. After the two substrates are bonded to each other, the liquid crystals between the first and second substrates are dispersed toward their peripheral regions to form a liquid crystal layer (not shown) having a uniform thickness.

The aforementioned process of fabricating the LCD panel is generally performed at the size of the parent substrate defined by a plurality of unit LCD panels. If the bonding process is completed, the bonded substrate of the first and second substrates is cut using scribing and breaking devices or by irradiating laser beams to the prescribed size of the unit LCD panel. Meanwhile, after the first and second substrates are bonded to each other, ultraviolet (UV) rays may be irradiated on the first substrate 100 or the second substrate 200 before or after using the scribing and breaking device so that the first sealant 150 may be hardened.

If the LCD panel 300 has a gravity defect when the LCD panel 300 is arranged in a vertical direction, the lower corner may expand causing light leakage during a gravity defect test, such as on/off lighting test.

In a method for repairing the LCD device according to the present invention, the LCD panel having such a gravity defect undergoes a predetermined repair process to obtain a normal LCD panel. An exemplary method for repairing the LCD device according to the present invention will be described with reference to the accompanying drawings.

As shown in FIGS. 4 and 5, the edge at one side of the LCD panel 300 having a gravity defect is cut. The cut portion is limited to the non-display area. At this time, the cut edge (region A) includes a predetermined sealant 150a of the first sealant 150. The liquid crystal layer has an exhausting outlet (see 155 of FIG. 6) at one edge (region A) of the LCD panel 300 through the above cutting process.

The one edge of the LCD panel 300 is cut by the scribing and breaking process or by irradiating laser beams. The scribing and breaking process may be performed using the scribing and breaking devices used to cut the bonded substrate of the first and second substrates at the size of the unit LCD panel.

Since the sealant 150a at one edge of the LCD panel 300 is removed by the scribing and breaking process or irradiating laser beams or by thermal process, the exhausting outlet (see 155 of FIG. 6) of the liquid crystals is provided at the cut portion. At this time, the liquid crystal layer is exposed to the outside. The exhausting outlet of the liquid crystals is adjacent to the portion where the gravity defect occurs and then pressurized to easily exhaust the liquid crystals. Meanwhile, referring to FIG. 4, the gate pad portion and the data pad portion are additionally provided with a pad line or a drive IC. Preferably, the one edge of the LCD panel 300 is cut without considering the portion corresponding to the gate pad portion and the data pad portion.

Figure 6:
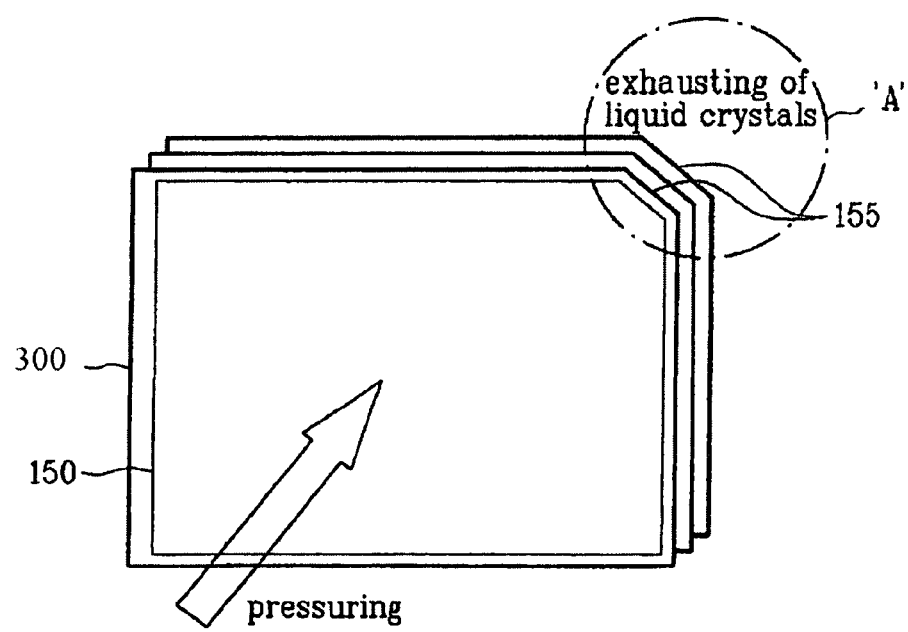
FIG. 6 is a plane view illustrating the process of exhausting liquid crystals as an exemplary LCD device of the present invention is pressurized during its repair.
Figure 7:
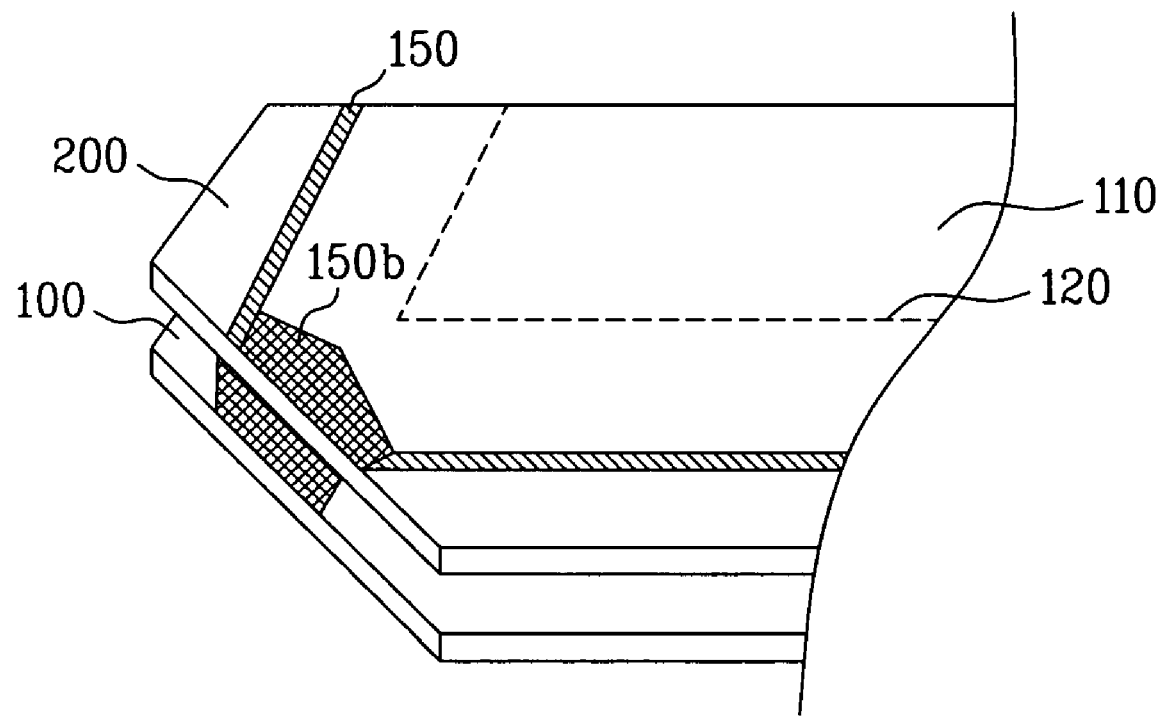
FIG. 7 is a perspective view illustrating the process of sealing an exhausting outlet of a cut portion after liquid crystals are exhausted in an exemplary LCD device of the present invention.
Figure 8:
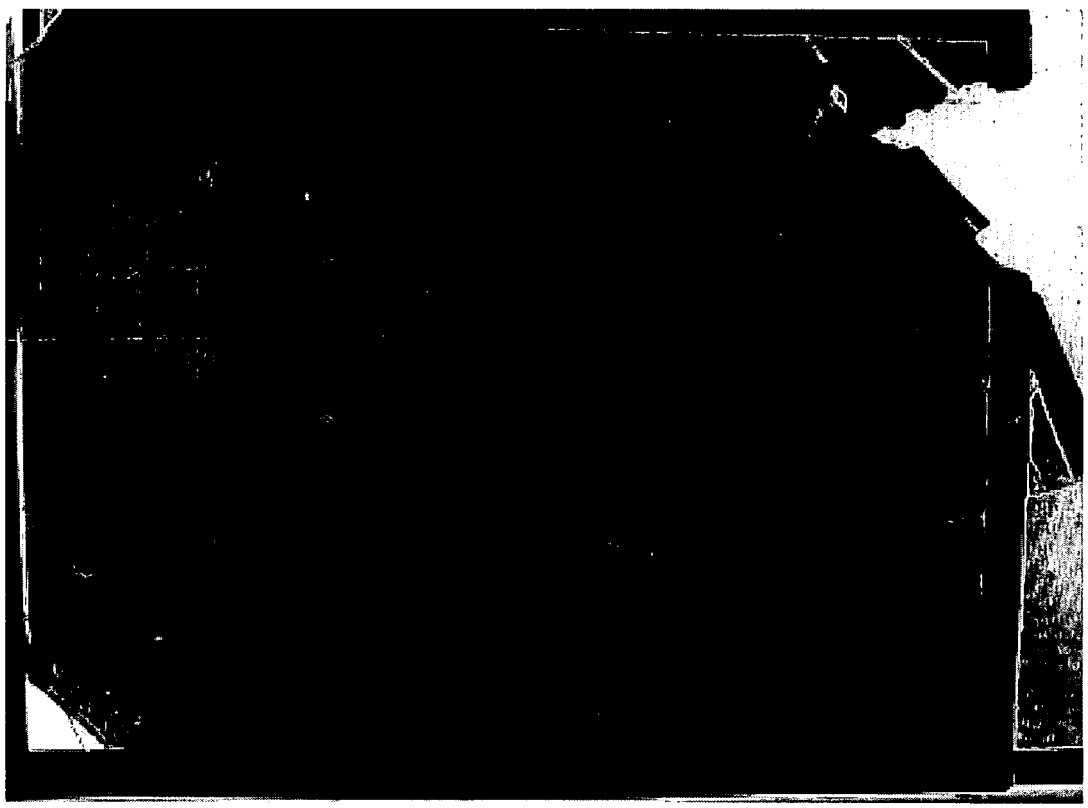
FIG. 8 is a photograph illustrating the state that a gravity defect is removed in an exemplary LCD device of the present invention.

FIG. 6 is a plane view illustrating the process of exhausting liquid crystals as an exemplary LCD device of the present invention is pressurized during its repair, FIG. 7 is a perspective view illustrating a process of sealing the opened exhausting outlet of the cut portion after the liquid crystals are exhausted in the LCD device of the present invention, and FIG. 8 is a photograph illustrating a state that the gravity defect is removed in the LCD device of the present invention.

As shown in FIG. 6, when the LCD panel 300 is pressurized from upper and lower surfaces through a pressurizing device after the cutting process of the LCD panel 300, the liquid crystals are exhausted through the opened exhausting outlet 155. The pressurizing device functions to apply pressure to the LCD panel 300. Applying pressure can be carried out by applying mechanical pressure or pneumatic pressure, such as air pressure or gas pressure.

At this time, the pressurizing conditions are provided considering the range of the gravity defect. For example, the level of the pressurizing force applied to the LCD panel may be in the range of very strong, strong, intermediate, weak, and very weak, and the pressure may be applied for a predetermined time period so that an amount of liquid crystal material may be exhausted to remove the gravity defect. Among the liquid crystals filled inside the LCD panel 300, the liquid crystal adjacent to the exhausting outlet falls in drops. The liquid crystal inside the LCD panel 300 is filled in the first and second substrates 100 and 200 without gap until the cutting process is performed. Such liquid crystals are gathered together even after the pressure is applied to the surfaces of the first and second substrates 100 and 200. Therefore, the liquid crystal can be exhausted in small quantities without being removed all together. Thus, the amount of the liquid crystals in the liquid crystal panel can be properly controlled.

Meanwhile, the process of applying a pressure to the LCD panel 300 can be performed so that the plurality of unit LCD panels 300 having the gravity defect are stacked in turn and then the upper and lower portions stacked in turn are uniformly pressurized. Alternatively, the process of applying a pressure to the LCD panel 300 may be performed so that each unit LCD panel is separately pressurized.

As shown in FIG. 7, after the surplus liquid crystal material causing the gravity defect is exhausted, a second sealant 150b is filled between the first and second substrates 100 and 200 at one edge of the LCD panel 300. The second sealant 150b is then hardened using such as the UV rays or thermal process, thereby completely sealing the liquid crystal layer.

As shown in FIG. 8, the light leakage observed at the lower corner has been removed as a result of a further gravity defect test performed for the LCD panel where the repairing process has been performed as above.

In the method for repairing the LCD device according to the present invention, one edge of the LCD panel is cut so that the surplus liquid crystal material that causes the gravity defect are exhausted to the outside, thereby removing the gravity defect. The liquid crystal exhausting outlet may be formed of a proper size to control the exhausting amount of the liquid crystals. The liquid crystal exhausting outlet may include a predetermined portion of a seal pattern among the cut portion of the LCD panel so that the liquid crystal layer is exposed from the one edge of the LCD panel after the cutting process. The exhausting outlet is positioned at a portion where the gravity defect occurs to more easily exhaust the liquid crystals.

As described above, the method for repairing the LCD device according to the present invention has a number of advantages. For example, the surplus liquid crystals can be removed from LCD panels having the gravity defect to obtain normal LCD panels, thereby improving the production yield. In addition, after the cutting process for exhausting the liquid crystals, since the surplus liquid crystals are removed and a new sealant is filled into the exhausting outlet of the liquid crystals, it is possible to stably position the liquid crystals inside the sealant without exhausting them to the outside even after the LCD panel is repaired.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for repairing a liquid crystal display (LCD) device whose LCD panel has a gravity defect to be repaired, the method comprising:
   (1) providing an LCD panel having a gravity defect to be repaired, wherein the LCD panel has rectangular shape, the LCD panel including first and second substrates opposing each other, a liquid crystal layer filled between the first and second substrates and a sealant formed between the first and second substrates at a periphery of the liquid crystal layer as a smaller rectangular shape than that of the first and second substrates, wherein the first and second substrates define a display area at a center and a non-display area around the display area;
   (2) cutting one corner of the LCD panel, wherein cutting is processed to diagonally cross two sides of the LCD panel adjacent to the one corner, by including cutting the first and second substrates and a portion of the sealant corresponding to the crossed two sides of the LCD panel adjacent to the one corner to have the same cut end;
   (3) applying pressure to a surface of the LCD panel to exhaust excess liquid crystal material through the cut corner; and
   (4) sealing the cut corner.

2. The method as claimed in claim 1, wherein the step of cutting the corner of the LCD panel includes cutting the LCD panel in the non-display area.

3. The method as claimed in claim 1, wherein the cutting the portion of the sealant is processed by irradiating laser beam or thermal process.

4. The method as claimed in claim 1, wherein the step of sealing the cut corner includes filling a dummy sealant at the cut portion of the sealant.

5. The method as claimed in claim 4, further comprising a step of hardening the dummy sealant.

6. The method as claimed in claim 5, wherein the step of hardening is processed by UV rays or thermal process.

7. The method as claimed in claim 1, wherein the step of cutting the corner of the LCD panel includes scribing and breaking the corner.

8. The method as claimed in claim 7, wherein the step of cutting the corner of the LCD panel further includes irradiating laser beams toward the corner.

9. The method as claimed in claim 1, wherein the step of applying pressure to the surface of the LCD panel includes using a device for pressurizing.

10. The method as claimed in claim 1, wherein the step of applying pressure to the surface of the LCD panel to exhaust the excess liquid crystal material includes controlling a pressurizing force and a pressurizing time period depending on a size of the gravity defect generated in the LCD panel.

11. The method as claimed in claim 1, wherein the step of applying pressure to the surface of the LCD panel to exhaust the excess liquid crystal material is performed for a plurality of LCD panels.

12. The method as claimed in claim 1, wherein the step of applying pressure to the surface of the LCD panel to exhaust the excess liquid crystal material is performed for a single LCD panel.

13. The method as claimed in claim 1, wherein the excess liquid crystal material exhausted through the cut corner corresponds to an amount of liquid crystal material that can remove the gravity defect.

* * * * *